United States Patent [19]

Weiler et al.

[11] Patent Number: 5,052,526
[45] Date of Patent: Oct. 1, 1991

[54] SPOT-TYPE DISC BRAKE

[75] Inventors: Rolf Weiler, Frankfurt am Main; Dieter Bieraeugel, Hochheim, both of Fed. Rep. of Germany

[73] Assignee: Alfred Teves GmbH, Frankfurt am Main, Fed. Rep. of Germany

[21] Appl. No.: 50,920

[22] Filed: May 15, 1987

[30] Foreign Application Priority Data

May 16, 1986 [DE] Fed. Rep. of Germany ....... 3616695

[51] Int. Cl.[5] .............................................. F16D 65/02
[52] U.S. Cl. ................................ 188/73.44; 188/73.34
[58] Field of Search ............... 188/73.34, 73.43, 73.44, 188/73.45, 73.46, 73.77

[56] References Cited

U.S. PATENT DOCUMENTS

| 4,109,766 | 8/1978 | Inoue et al. | 188/73.34 |
| 4,330,049 | 5/1982 | Cybulski et al. | 188/73.36 |
| 4,392,559 | 7/1983 | Oshima | 188/73.45 |
| 4,480,724 | 11/1984 | Hoffman, Jr. | 188/73.44 X |
| 4,553,645 | 11/1985 | Mery | 188/73.34 |
| 4,577,731 | 9/1986 | Burgdorf et al. | 188/73.44 |
| 4,709,789 | 12/1987 | Czich et al. | 188/73.44 |
| 4,741,419 | 5/1988 | Rath | 188/73.45 |

FOREIGN PATENT DOCUMENTS

| 0137937 | 4/1985 | European Pat. Off. |
| 1302668 | 3/1973 | Fed. Rep. of Germany |
| 2558141 | 7/1976 | Fed. Rep. of Germany |
| 2804808 | 8/1979 | Fed. Rep. of Germany |
| 2919534 | 2/1980 | Fed. Rep. of Germany |
| 3036985 | 5/1982 | Fed. Rep. of Germany |
| 1427692 | 3/1976 | United Kingdom |
| 2030251 | 4/1980 | United Kingdom |
| 2049846 | 12/1980 | United Kingdom |
| 2056602 | 3/1981 | United Kingdom |
| 2147673 | 5/1985 | United Kingdom |

Primary Examiner—Matthew C. Graham
Attorney, Agent, or Firm—Robert P. Seitter; J. Gordon Lewis

[57] ABSTRACT

A spot-type disc brake is disclosed including a brake carrier including a mounting section extending substantially in parallel to a brake disc, and two brake carrier arms protruding beyond the rim of the brake disc. A brake housing is disposed in axially displaceable manner on the brake carrier and accommodates an actuating means. The brake housing straddles the rim of the brake disc and two brake shoes wherein the brake shoes are supported and guided on the brake carrier. To permit a simple and low-cost manufacture, at least one guide member is fixed to the brake housing which for guiding the brake housing is mounted on guide sections of one of the brake shoes.

7 Claims, 1 Drawing Sheet

SPOT-TYPE DISC BRAKE

BACKGROUND OF THE INVENTION

The present invention relates to a spot-type disc brake of the type including a brake carrier including a mounting section extending substantially in parallel to a brake disc and two brake carrier arms which project beyond the rim of the brake disc. The disc brake also includes a brake housing axially displaceable on the brake carrier and accommodates actuating means. The housing straddles the rim of the brake disc and two brake shoes, with the brake shoes being supported and guided on the brake carrier.

A stop-type disc brake of this type is disclosed in the German patent DE 28 04 808 B2. In present spot-type disc brakes, the brake shoes, in the end zones thereof, are provided with radially extending bridges which are formed to support and guide the brake shoes and to uniformly transfer the forces developed during deceleration in the circumferential direction to the two brake carrier arms. In these disc brakes the two brake shoes have identically configured back plates. While these brakes offer a satisfactory solution to the problem of providing for uniform force distribution such that the brake carrier arms may be correspondingly dimensioned, the manufacture of these brakes involves substantial effort and is relatively expensive.

SUMMARY OF THE INVENTION

It is, therefore, the object of the present invention, to improve the conventional spot-type disc brake in that manufacturing efforts and costs are reduced.

This object is achieved according to the invention which provides for finished guide elements to be mounted on the brake housing such that additional processing operations on the brake housing, such as broaching and the like, can be eliminated. According to the invention, the guide elements for this purpose are in the form of guide pins.

According to an advantageous feature of this invention, the guide elements are disposed on the side of the brake housing opposite the actuating means. The brake shoe on which the guide element is mounted includes at least one substantially radially extending bridge forming at least one abutment face for the guide element. Advantageously, an abutment face extending in substantially radial direction is provided on the bridge and, in side-by-side relationship therewith, an abutment face extending in substantially tangential direction is provided for the guide element.

According to another highly advantageous feature of the invention, the brake shoe associated with the actuating means is provided with a back plate which is shorter in length than the back plate of the other brake shoe and does not require bridges extending crosswise for the support and the force transfer. The elimination of such support bridges is possible without affecting force transfer because according to the invention the brake pad, in the area of the mounting section, is disposed in a guide shaft. Accordingly, manufacturing costs in the area supporting the inner brake shoe are thereby reduced.

According to another important feature, the brake shoe associated with the actuating means includes abutment faces extending in substantially radial direction to which are associated abutment faces correspondingly disposed on the brake carrier. This brake shoe also includes substantially tangentially extending bearing faces to which are associated correspondingly extending bearing faces disposed on the brake carrier. The bearing faces on the brake carrier are disposed in the plane of the piston of the actuating means, with the contact faces of the brake shoe associated with the actuating means being minimized and thereby insensitive to corrosion.

The brake shoe associated with the brake applying means, advantageously, can be provided with a spring capable of being supported on the brake housing, with the spring, preferably, being configured as a stem spring having two windings of which one is disposed on one side of the back plate of the brake shoe and of which the other is located on the other side of the back plate of the brake shoe, with recesses, being provided in the back plate. Specifically, a spring of the type shown and described in German Patent DE-OS 32 20 632.1 may be used.

Advantageously, a bolt guide is provided on the side of the housing associated to the actuating means to form the guide for the brake housing. The bolt guide includes two guide bolts having a guide sleeve and a threaded bolt passed therebetween for fixation to the brake carrier.

Provided between the guide bolts and the corresponding bores in the brake housing are flexible damping sleeves including a rubber material exhibiting anti-friction properties so as to avoid the use of floating insets as is employed with conventional brakes. To preclude ingress of dirt into the interior of the damping sleeve, the same is provided with radially inwardly projecting sealing lips especially located at the two ends. The sealing lips are so configured as to maintain the sealing function during any radial displacement of the guide bolt, which is achieved by sealing lip shaping and prestressing. Preferably, the sealing lips include conical flanks and, in a non-loaded condition, are of a small inside diameter.

According to another advantageous feature, the outer brake shoe includes an abutting and a bearing face, respectively, for receiving a guide member on the brake caliper. The abutting or bearing faces are provided in the area of a brake shoe bridge which extends substantially in a radial direction.

The inner brake shoe associated with the actuating means, is of shorter length than an outer brake shoe. The outer shoe is provided with the bridge which extends in both the transverse and in the radial direction, circumferentially effective forces are transferred to the two brake carrier arms through the bridge.

BRIEF DESCRIPTION OF THE DRAWING

The invention will be better understood after reading the following Detailed Description Of The Preferred Embodiment in conjunction with the drawing in which.

DETAILED DESCRIPTION OF THE PREFERRED EMBODIMENT

Figure 1:
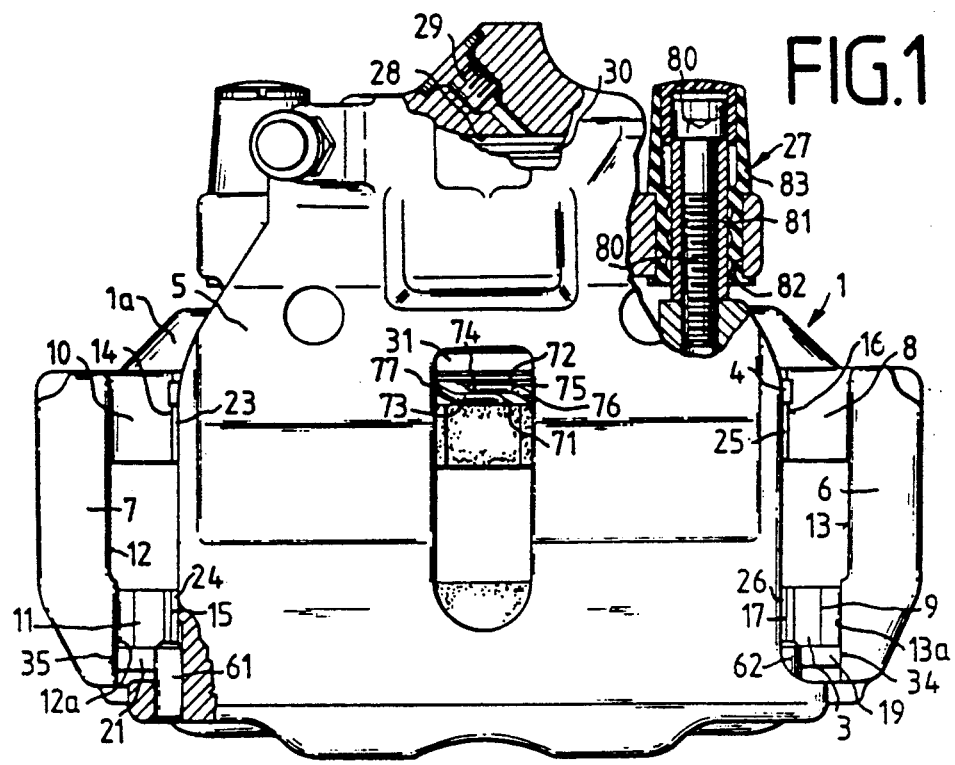
FIG. 1 is a plan view of a spot-type disc brake according to the invention.

Shown in the drawing is a floating caliper spot-type disc brake for automotive vehicles, including a brake carrier 1 having a mounting section 1a to be stationarily affixed to a steering knuckle of an automotive vehicle.

Brake shoes 3, 4 are axially displaceably guided and held on the brake carrier on either side of a brake disc (not shown) and a brake caliper 5 externally straddles the rim of the brake disc and the brake shoes 3, 4 in U-shaped manner. The brake carrier 1, in circumferential and tangential directions, respectively, relative to the brake disc includes spaced-apart brake carrier arms 6, 7 straddling the rim of the brake disc and grooves 8, 9, 10, 11 on either side of the brake disc. The delimiting surfaces of the grooves 8, 9 and 10, 11, respectively, disposed in a brake carrier arm 6 and 7, respectively, are each disposed in common planes extending in parallel to the axis of rotation of the brake disc.

The wall surface 12 facing the brake center, in the circumferential direction, is slightly off-set, with only the axially outer section 12a being a machined surface. The same structure applies to the other wall surface 13 and 13a, wherein section 13a is a machined surface. The wall surfaces of grooves 8, 9, 10 and 11 opposite the wall surfaces 12, 13 are designated by numerals 14, 15, 16, 17. Wall surfaces 14, 15, 16, 17 terminate within the outer circumference of the brake disc to abut bearing surfaces 23, 24, 25, 26 which are located in a common plane extending in the tangential or circumferential direction and which coincide with the surface center of gravity of the brake piston 30. These bearing 23, 24, 25, 26 surfaces are all machined surfaces.

The carrier plates of the brake shoes 3, 4 are mounted on the bearing faces 23, 24, 25, and 26. The carrier plate of the outer brake shoe 3 includes ends 19, 21 which extend down to the wall faces 12, 13 to support itself, and the front sides 34, 35 thereof, are disposed externally of the outer circumference of the brake disc. Provided at the ends of the brake shoe 3 are radially inwardly directed lugs 19', 21' the front surfaces of which face one another and are in abutment with the wall faces 15, 17, with the clearance between the wall faces 15, 17 and the front faces of the lugs being equal to or smaller than the clearance between the front sides 34, 35 and the wall surfaces 12, 13. This structure assures that the frictional forces acting on the brake shoes during application of the brake either are transferred solely to the front brake carrier arm or to both carrier arms, but in no case to solely the rear brake carrier arm.

The carrier plate of the inner brake shoe 4 in the end areas thereof includes two bearing surfaces mounted on the correspondingly machined supporting faces 23, 24 of the brake carrier. Abutment faces of the carrier plate extending vertically thereto are supported on correspondingly machined abutment faces provided in the area of the mounting section of the brake carrier, one of which is designated by numeral 35.

The brake housing 5 is connected in a manner axially displaceable to the brake carrier by means of bolt guides 27 disposed on the side of the brake carrier 1 facing away from the brake disc. Between the bolt guides 27, the brake housing 5 is provided with a hydraulic brake applying cylinder 28 to which pressure fluid is supplied through a connecting bore 29. Piston 30 of the actuating cylinder 28 through the front face thereof is directly in abutment with the brake shoe 4. A rubber protective cap 31 protects the sliding surface of the piston 30 against damage or ingress of dirt.

Figure 2:
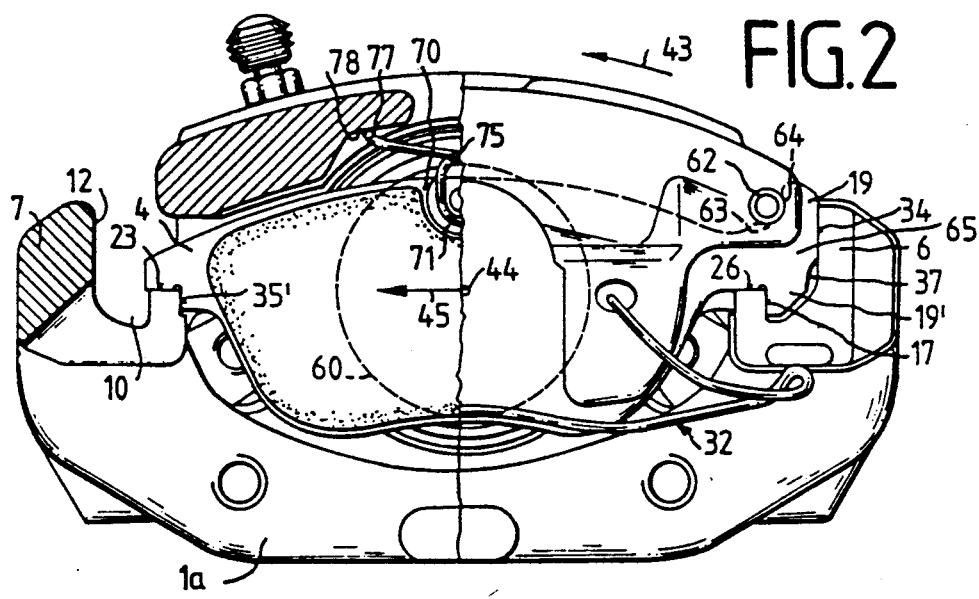
FIG. 2 is a front partial cross-sectional view of the disc brake of FIG. 1, as viewed from the outside.

The brake housing 5, on the side of the brake disc opposite the actuating cylinder 28 includes two lugs extending circumferentially, wherein axially extending pins 61, 62 are fixed. Pins 61, 62 are press fitted into corresponding bores. The pins extend toward the brake disc and are mounted on the bearing surfaces formed by the carrier plate of the outer brake shoe 3, one of which, in FIG. 2, is designated by numeral 63. Bearing faces 63 substantially extend in the circumferential direction. Abutment faces substantially extend at right angles thereto, one of which, in FIG. 2, is designated by numeral 64.

Both the abutment faces 64 and the bearing faces 63, in the area of a transverse-extending bridge 65, are formed on the carrier plate of the brake shoe 3. Pins 61, 62 are mounted against the respective bearing faces 63 and abutment faces 64 thereby providing a guide. The portion of brake housing 5 disposed between the abutment faces 64, forms a support resulting in a reduction of flexing stress at the carrier plate of the brake carrier. The ends of the brake shoe 3, are, therefore, exposed to only minor flexible deformation.

Disposed on the side of the housing opposite the actuating cylinder 28 is a wire spring 32 forming circumferentially extending arms that are supported on the bottom side of the brake carrier arms 6, 7, and free ends which engage apertures in the brake housing 5 for fixing the spring. The brake housing 5 is thereby loaded over the brake carrier through the carrier plate of the brake shoe 3. Stated differently, the spring forces the brake housing 5 and, hence, the pins 61, 62 against the bearing faces 63 of the carrier plate of the brake shoe 3, with the brake shoe being forced against the bearing surfaces 24, 26 formed on the brake carrier arms 6, 7.

The inner brake shoe 4 includes a centrally located pad-free section 70. Provided on the front and on the rear side of that section 70, are recesses 71, 72 in which are disposed windings 73, 74 of a stem spring 75. The free stems 76, 77 of the stem spring 75 are supported on the inner side of the brake housing 5 which, in that area, forms a shoulder 78. The brake shoe 4 is forced by the stem spring 75 against the bearing surfaces 23, 25 on the brake carrier arms 6, 7.

Figure 3:
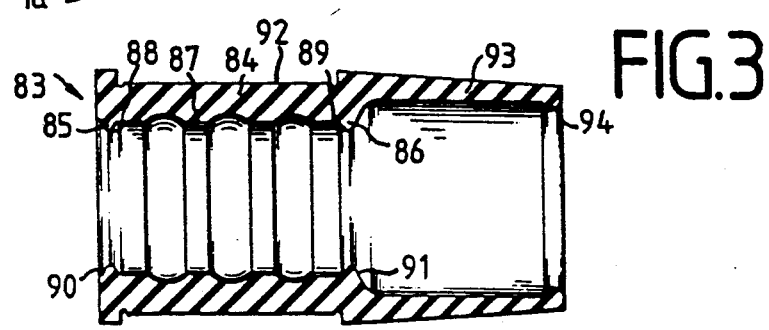
FIG. 3 is a cross-sectional view of a damping sleeve.

Two bolt guides 27 are provided for guiding the brake housing on the side proximate the actuating means. Bolt guides 27 each include a threaded bolt 80 guided through a guide sleeve 81 and threaded into the brake carrier. The head 82 of the threaded bolt 80 forces the guide sleeve 81 against a surface of the brake carrier. Seated between the guide sleeve 81 and a bore 82 in the brake housing 5 is a flexible damping element 83 shown in detail in FIG. 3. The flexible damping member 83 includes a substantially cylindrical base body 84 provided on the inner side thereof with radially inwardly protruding sealing lips 85, 86. Provided between the sealing lips 85, 86 respectively disposed at the end of a sealing area, are further protruding lips 87 which, protrude radially inwardly a lesser degree than the sealing lips 85, 86. The sealing lips 85, 86 include conical flanks 88, 89 facing one another. Faces 90, 91 of the sealing lips 85, 86 facing away from one another, are of an accurate configuration. Formed on the outer circumference of the damping sleeve 83 is a groove 92 to insert the damping member into the bore 82 of brake housing 5 and maintain same therein. Additional lips may be provided on an extension 93 joining the cylindrical base body of the damping member, with a sleeve 94 being provided in the end region in the form of embodiment as shown in FIG. 3. The damping sleeve 94 is made of a rubber material having anti-friction properties. Ingress of dirt into the interior of the damping sleeve is reliably precluded by means of the sealing lips 85, 86, with the sealing lips 85, 86 being so designed that the sealing function during a radial displacement of the guide bolt, is maintained. The seal is achieved by appropriate shaping and prestressing of the lip. For that purpose, the sealing lips 85, 86, specifically, are of a small inside diameter in the non-loaded condition and include the afore-mentioned conically extending flanks.

Operation of the spot-type disc brake will now be explained in greater detail with reference to FIG. 2. Basic to the description of operation is the assumption that the brake disc rotates in the counter-clockwise direction as indicated by arrow 43. The line of action 45 of the resultant frictional forces extends through point 44 coinciding with the piston center. If the clearance arising during manufacture between the wall face 15 and the neighboring front face of the brake shoe 3 is smaller than the clearance between the wall face 17 and the front side 35, the brake shoe, in the indicated direction of rotation of the brake disc, will first be supported on the wall surface 12a. As the line of action of the resulting frictional forces extends approximately at the level of the supporting surface 24, no substantial torque will occur on the brake shoe 3. The end 19 will be held through frictional engagement with the wall surface 12 in its at rest position on the supporting surface 26. If the brake shoe 3, with a greater clearance between its front faces and the wall face 17, or after a flexible deformation of the brake carrier arm 6, with the front side 35 thereof is supported on the wall face 12a, due to the position of the abutment face radially externally of the line of action 45 achieved by recesses 37 in the abutment faces 34, 35, a torque occurs on the brake shoe 3 tending to force the end 19 of the brake shoe 3 against the supporting face 26. As a result of the mirror-inverted configuration of the brake shoe 3, this will also apply, in analogy, to the reverse direction of rotation. The inner brake shoe 4 with the brakes applied, will be forced with the radially extending abutment face against the corresponding abutment face 35 of the brake carrier arm 7.

What is claimed is:

1. A spot-type disc brake, comprising a brake carrier including a mounting section extending substantially in parallel to a brake disc, and two brake carrier arms protruding beyond the rim of the brake disc, a brake housing disposed on the brake carrier straddling the rim of the brake disc in a manner axially displaceable and accommodating actuating means, two brake shoes supported and guided on the brake carrier and at least one guide element fixed to the brake housing, said guide element movably mounted on and being in abutment against guide sections of one of said two brake shoes to guide the brake housing, said spot-type disc brake further comprising two guide elements in the form of two guide pins located on a side of the brake housing opposite the actuating means, wherein said one brake shoe on which the guide elements are mounted includes at least one substantially radially extending bridge portion forming at least one abutment face for receiving the guide element, said spot-type disc brake further comprising two abutment faces on said bridge portion, one abutment face extending substantially in a radial direction and a second abutment face extending substantially in a tangential direction, wherein said one brake shoe including the bridge portion is disposed on the side of the brake housing opposite the actuating means, and wherein a second of said two brake shoes is mounted for engagement by the actuating means and includes a carrier plate which is shorter in length that a carrier plate of said one brake shoe.

2. A spot-type disc brake according to claim 1, wherein said second brake shoe includes a pair of abutment faces extending substantially in the radial direction, said brake carrier includes a pair of abutment faces adjacent said pair of abutment faces, said second shoe further includes a pair of extending substantially bearing faces in the tangential direction, and said carrier includes a pair of bearing faces adjacent said pair of bearing faces on said second shoe.

3. A spot-type disc brake according to claim 2, wherein the bearing faces on said second shoe are located in the area of a back plate of the second brake shoe.

4. A spot-type disc brake according to claim 1, wherein the second brake shoe includes a spring supported on the brake housing.

5. A spot-type disc brake according to claim 4, wherein said brake carrier includes a mounting section extending substantially in parallel to the brake disc and a pair of guide bolts for mounting said housing to said carrier and for supporting a resilient damping member.

6. A spot-type disc brake according to claim 5, wherein the resilient damping member includes at least two radially inwardly projecting lips.

7. A spot-type disc brake according to claim 3, wherein at least one of the two lips includes a conical flank.

* * * * *